US008830904B2

(12) United States Patent
Kim et al.

(10) Patent No.: US 8,830,904 B2
(45) Date of Patent: Sep. 9, 2014

(54) METHOD FOR CONTROLLING UPLINK POWER CONTROL CONSIDERING MULTIPLEXING RATE/RATIO

(75) Inventors: Dong Cheol Kim, Suwon-Si (KR); Bin Chul Ihm, Gunpo-Si (KR); Jin Sam Kwak, Anyang-si (KR); Wook Bong Lee, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 755 days.

(21) Appl. No.: 12/746,710

(22) PCT Filed: Dec. 12, 2008

(86) PCT No.: PCT/KR2008/007380
§ 371 (c)(1),
(2), (4) Date: Jun. 7, 2010

(87) PCT Pub. No.: WO2009/075548
PCT Pub. Date: Jun. 18, 2009

(65) Prior Publication Data
US 2010/0254292 A1 Oct. 7, 2010

(30) Foreign Application Priority Data
Nov. 14, 2008 (KR) .................. 10-2008-0113261

(51) Int. Cl.
*H04B 7/185* (2006.01)
*G08C 17/00* (2006.01)
*H04W 52/14* (2009.01)
*H04W 52/34* (2009.01)
*H04M 1/00* (2006.01)
*H04L 1/00* (2006.01)

(52) U.S. Cl.
CPC .......... *H04W 52/146* (2013.01); *H04W 52/343* (2013.01); *H04L 1/0003* (2013.01); *H04L 1/0009* (2013.01); *H04L 1/0015* (2013.01); *H04W 52/346* (2013.01); *Y02B 60/50* (2013.01)
USPC ....... 370/318; 370/311; 370/343; 379/395.01

(58) Field of Classification Search
CPC .................. H04W 52/0216; H04W 52/0209; H04W 52/343; H04W 52/22; H04W 52/346; H04W 52/212
USPC ..................... 370/311, 318, 343; 379/395.01; 340/7.34
See application file for complete search history.

(56) References Cited

U.S. PATENT DOCUMENTS 7,813,751 B2* 10/2010 Mizuguchi ................... 455/522
2002/0018516 A1 2/2002 Mizuguchi (Continued)

FOREIGN PATENT DOCUMENTS

JP 2002-57634 A 2/2002
JP 1337833 A 2/2002
JP 1492609 A 4/2004

OTHER PUBLICATIONS

Basic Concepts of WCDMA Radio Access Network, Ericsson Radio Systems AB 2001.*

*Primary Examiner* — Omer S Mian
(74) *Attorney, Agent, or Firm* — Birch, Stewart, Kolasch & Birch, LLP

(57) ABSTRACT

A method for maintaining system interference at a low level when two or more users use one resource region in a wireless mobile communication system is provided. To control an uplink transmission power in a broadband wireless mobile communication system in multi-cell environments, information regarding the number of users who share an uplink time-frequency resource region is received from a base station, a power adjustment value is calculated based on the received number of users, and the uplink transmission power is determined by reflecting the calculated power adjustment value in a reference transmission power. Here, when only one mobile station uses the uplink time-frequency resource region, the reference transmission power is equal to a transmission power of the mobile station.

7 Claims, 12 Drawing Sheets

(56) References Cited

U.S. PATENT DOCUMENTS

| | | |
|---|---|---|
| 2004/0203985 A1 | 10/2004 | Malladi et al. |
| 2004/0252658 A1* | 12/2004 | Hosein et al. .................. 370/328 |
| 2006/0040619 A1 | 2/2006 | Cho et al. |
| 2006/0286995 A1 | 12/2006 | Onggosanusi et al. |
| 2007/0060192 A1* | 3/2007 | Morimoto et al. ............ 455/525 |
| 2007/0121535 A1* | 5/2007 | Chen et al. .................... 370/317 |
| 2007/0129094 A1 | 6/2007 | Jeong et al. |
| 2008/0075043 A1* | 3/2008 | Wang et al. .................... 370/330 |
| 2008/0117849 A1* | 5/2008 | Borran et al. .................. 370/311 |
| 2010/0029322 A1* | 2/2010 | Englund et al. ............... 455/522 |
| 2011/0009157 A1* | 1/2011 | Osterling et al. ............. 455/522 |
| 2011/0194571 A1 | 8/2011 | Ozluturk et al. |

* cited by examiner

METHOD FOR CONTROLLING UPLINK POWER CONTROL CONSIDERING MULTIPLEXING RATE/RATIO

TECHNICAL FIELD

The present invention relates to a broadband wireless mobile communication system, and more particularly, to transmission power control.

BACKGROUND ART

In order to increase data transfer rate and system capacity, next-generation mobile communication and wireless transmission systems use a Multi-Input Multi-Output (MIMO) scheme in which data is transmitted using multiple antennas.

Single-user MIMO forms a channel matrix H between one Mobile Station (MS) having two or more antennas and a Base Station (BS) having two or more antennas. On the other hand, multi-user or collaborative MIMO forms a channel matrix H between two or more MSs, each having one antenna, and one BS having multiple antennas. The concept of uplink collaborative MIMO is illustrated in FIG. 1. This method has several advantages. First, each MS needs only one power amplifier since only one transmission path is necessary for the MS. In addition, even though each MS operates with other MSs in a MIMO scheme, it is not necessary to divide an output of the MS into respective signals for antennas since the MS transmits signals using one antenna, and thus the MS need not undergo a 3 dB power loss that is common in general MIMO. Second, if two MSs are appropriately selected as described above, it is possible to obtain a much better channel matrix H than when two antennas are installed in one MS.

In the first-generation MIMO scheme, it is assumed that one BS and one user (MS) transmit a plurality of information simultaneously through multiple antennas. On the other hand, in the multi-user MIMO scheme, one BS and multiple users (MSs) create a matrix for MIMO Spatial Multiplexing (SM) as can be seen from FIGS. 1 and 2. It can be understood from the basic concept of MIMO that the channel characteristics matrix for MIMO SM is further improved as the correlation between inner values of the matrix decreases. Accordingly, when multiple users are considered at once, it is possible to obtain a matrix with better channel characteristics since the antennas of the users are expected to have a lower correlation therebetween.

Particularly, if only the single-user MIMO scheme should be used in the example of FIG. 2, the BS should determine an MS with which the BS should form a 2×2 matrix at a specific time in order to achieve the highest transfer rate. It is possible to achieve a transfer rate of a total of 2.5 Mbps (2.0+0.5) if the BS forms a MIMO channel with User-1, to achieve a transfer rate of a total of 2.0 Mbps if the BS forms a MIMO channel with User-2, and to achieve a transfer rate of a total of 1.8 Mbps if the BS forms a MIMO channel with User-3. Accordingly, the BS forms a single-user MIMO channel with User-1 at the given time.

However, in the case where the multi-user MIMO scheme is used, it is possible to determine that signals carried over different transmit antennas are signals for transmission to different users. Therefore, in this case, it is possible to achieve a transfer rate of a total of 3.5 Mbps (2.0+1.5) by carrying a signal for transmission to the User-1 over the antenna #1 and carrying a signal for transmission to the User-2 over the antenna #2.

Even in the multi-user MIMO system, a MIMO channel may be formed between the BS and a single user in the case where a transfer rate that can be achieved between the BS and the user at a specific time is the highest among all combinations of transfer rates. Thus, it can be understood that the multi-user MIMO is conceptually broader than the single-user MIMO.

The conventional technologies use a single-user power control scheme in which it is assumed that only one user uses a specific resource, regardless of the number of users that transmit signals by simultaneously using the same resource. However, actually, a number of users may use the same resource as in the multi-user MIMO scheme.

However, in a wireless mobile communication system, as the number of users increases, the sum of powers of signals transmitted from users increases and thus the interference between communication devices in the system increases. The increased interference may reduce reception performance of the BS. In addition, in multi-cell environments, if the number of MSs which use the same resource in a specific cell increases, interference with MSs which use the same resource in a neighbor cell adjacent to the specific cell may increase. Accordingly, when a number of users transmit signals through the same resource, a factor in consideration of such transmission through the same resource should be reflected in the power control scheme.

DISCLOSURE

Technical Problem

An object of the present invention devised to solve the problem lies on maintaining the same level of interference as in the single user power control scheme, by taking into consideration the multi-user MIMO scheme, in which two or more users use one resource, when uplink power control is performed.

Technical Solution

In one aspect of the present invention, the objects of the present invention can be achieved by providing a method for controlling uplink transmission power in a wireless mobile communication system that uses a frequency division multiplexing scheme in multi-cell environments, the method including receiving information regarding a number of users who are allocated a resource region at a given time, and performing uplink power control based on the received number of users.

In another aspect of the present invention, provided herein is a method for controlling uplink transmission power in a wireless mobile communication system that uses a frequency division multiplexing scheme in multi-cell environments, the method including receiving information regarding a number of users who share an uplink time-frequency resource region from a base station, calculating a power adjustment value based on the received number of users, and determining the uplink transmission power by adding the calculated power adjustment value to a reference transmission power, wherein, when only one mobile station uses the uplink time-frequency resource region, the reference transmission power is equal to a transmission power of the mobile station.

Here, the expression "two or more mobile stations (or users) share an uplink time-frequency resource region" indicates that two or more mobile stations transmit signals using the same frequency at the same time. The addition of the calculated power adjustment value to the reference transmission power is performed under the assumption that both the values are represented in logarithmic scale. Either multiplication or division may be used when both the calculated power adjustment value and the reference transmission power are represented in linear scale.

Preferably, at the calculating step, the power adjustment value may be given by—M(dB), where M is the received number of mobile stations. At the calculating step, the power adjustment value may also be calculated by a joint function including the received number of mobile stations and a Modulation Coding Scheme (MCS) level as independent variables.

Here, the term "joint function" may indicate that the output of the function is determined based on input variables having a zero or nonzero correlation with each other.

In another aspect of the present invention, provided herein is a method for controlling uplink transmission power in a wireless mobile communication system that uses a frequency division multiplexing scheme in multi-cell environments, the method including receiving information regarding a number of mobile stations which share an uplink time-frequency resource region from a base station, and determining the uplink transmission power by a joint function including the received number of mobile stations and a reference transmission power as independent variables, wherein, when only one mobile station uses the uplink time-frequency resource region, the reference transmission power is equal to a transmission power of the mobile station.

In another aspect of the present invention, provided herein is a method for controlling uplink transmission power in a wireless mobile communication system that uses a frequency division multiplexing scheme in multi-cell environments, the method including determining a number of mobile stations which share an uplink time-frequency resource region, determining a transmission power of a mobile station based on at least one parameter including the determined number of mobile stations, and generating a transmission power command message including information regarding the determined transmission power and transmitting the generated transmission power command message to the mobile station.

Here, the at least one parameter including the determined number of mobile stations may include a noise power level or an interference signal level at a base station. This method may be repeated at regular intervals or at irregular intervals.

Preferably, the transmitting step may be performed at regular intervals. The transmission power command message may also be a dedicated message for the mobile station. Alternatively, when the number of mobile stations is determined to be equal for all frequency bands, the transmission power command message may be a broadcast message. In addition, at the step of determining the number of mobile stations, a number of mobile stations M1 at a time T1 and a number of mobile stations M2 at a time T2 may be calculated and a more recently calculated number of mobile stations among the two numbers of mobile stations M1 and M2 may be determined to be the number of mobile stations which share the uplink time-frequency resource region.

That is, since the above method may be repeated a number of times, the transmission power command message may be transmitted a number of times. The number of mobile stations which share the same resource can be repeatedly determined twice or more during the time interval between one transmission power command message and another transmission power command. Here, only the number of mobile stations determined immediately before the transmission power command message is transmitted can be used.

In another aspect of the present invention, provided herein is a method for controlling uplink transmission power in a wireless mobile communication system that uses a frequency division multiplexing scheme in multi-cell environments, the method including a base station determining a number of mobile stations which share an uplink time-frequency resource region and transmitting the determined number of mobile stations to a mobile station, the mobile station receiving the number of mobile stations and determining a power adjustment value based on the received number of mobile stations, and determining the uplink transmission power by adding the determined power adjustment value to a reference transmission power value.

Preferably, the reference transmission power value may be a transmission power of a last frame among frames that have already been transmitted. Alternatively, when only one mobile station uses the uplink time-frequency resource region, the reference transmission power value may be equal to a transmission power of the mobile station. Here, the power adjustment value may be given by—M(dB), where M is the received number of mobile stations. At the calculating step, the power adjustment value may also be calculated by a joint function including the received number of mobile stations and an MCS level as independent variables.

Advantageous Effects

According to the present invention, it is possible to reduce the level of system interference when two or more mobile stations use the same time-frequency resources in a broadband wireless mobile communication system in multi-cell environments.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
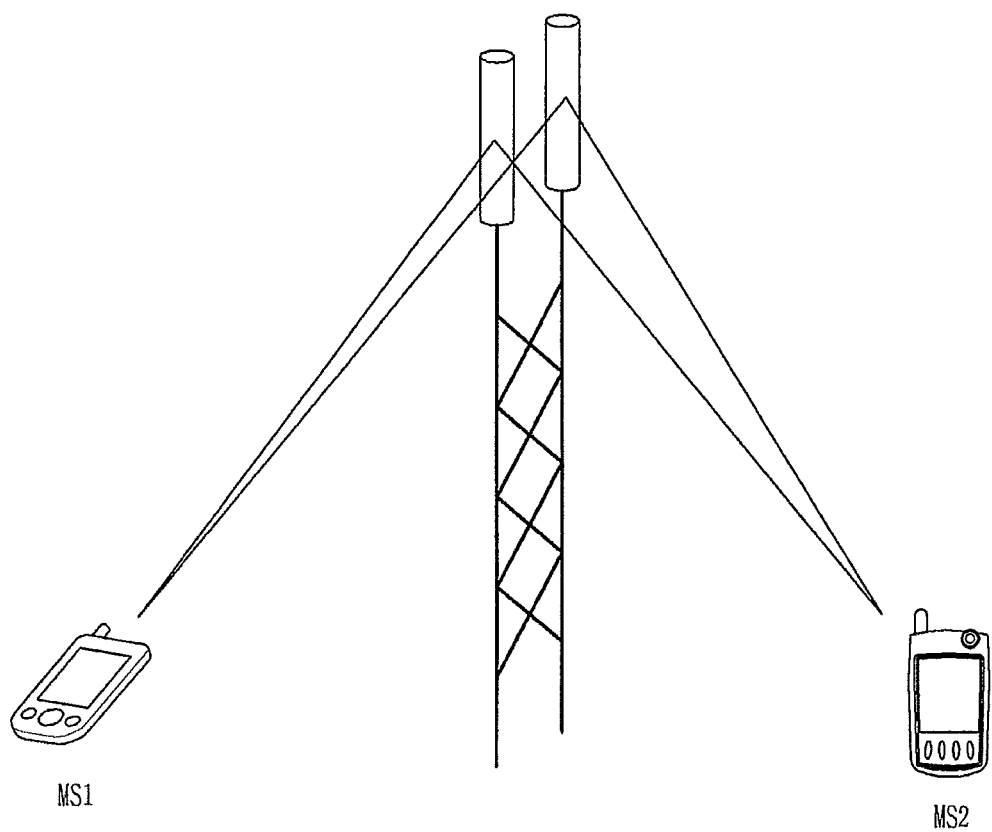
FIG. 1 illustrates the concept of uplink collaborative MIMO.
Figure 2:
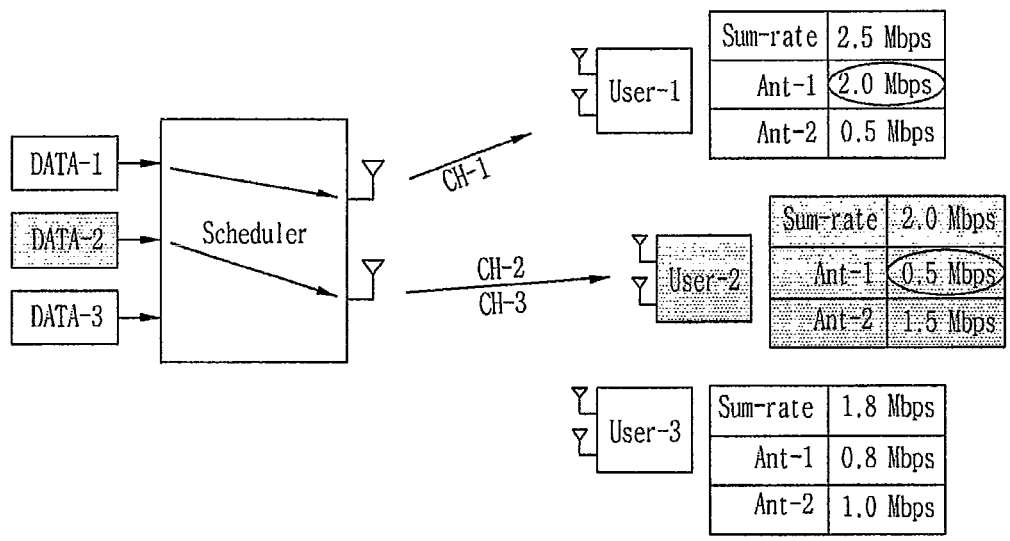
FIG. 2 illustrates an example downlink multi-user MIMO system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

In the conventional technology, power control is performed under the assumption that a single user uses one resource region. Accordingly, in the case of a multi-user multiplexing scheme in which two or more users use one resource region, the level of interference is increased, thereby reducing communication performance. Particularly, in multi-cell environments, communication performance may be reduced by interference due to radio waves from neighbor cells. As the number of MSs which use the same resource increases, the amount of interference caused to neighbor cells increases in proportion to the number of MSs. In this case, communication performance may be significantly reduced due to interference. Accordingly, there is a need to perform power control taking into consideration the multi-user multiplexing scheme. In the following description of the present invention, a single user may be referred to as a "single mobile station (MS)".

Since all CDMA schemes use a frequency reuse factor of "1" in order to efficiently use frequency resources, multiple subscribers and multiple BSs can simultaneously use the same frequency channel. Even in a communication scheme such as OFDMA, multiple subscribers and multiple BSs can simultaneously use the same frequency channel in the case where a collaborative MIMO scheme or a multi-user MIMO scheme is used. Accordingly, since BSs and users who simultaneously use the same frequency for communication cause interference to each other, it is necessary to control such interference for proper system operation.

In terms of guaranteeing the same quality for users who are in communication, a Block Error Rate (BLER) is used as a criterion for quality in an asynchronous wireless mobile communication scheme and a Frame Error Rate (FER) is used as a criterion for quality in a synchronous wireless mobile communication scheme.

Power control is used to 1) maximize the capacity of communication of the serving BS, 2) extend MS battery life, 3) maximize the capacity of communication of each neighbor BS, and (4) maintain uniform communication quality.

Power control is mainly divided into open-loop power control and closed-loop power control.

In open-loop power control, when an MS attempts to perform communication in downlink and transmits a response to paging from a BS, the MS can derive the loss (or attenuation) of a path between the BS and the MS from a downlink signal received from the BS. The BS determines uplink transmission power based on the path loss derived in this manner, the level of noise at the BS, and the level of interference at the BS. Using this method, the output (or power) of the MS is minimized as much as possible, thereby minimizing its effects on the capacity and quality of uplink communication.

When it is assumed that the same MCS level and the same bandwidth are used for all MSs, an MS located near the BS transmits a signal at a low output level and an MS located distant from the BS transmits a signal at a high output level in both the cases of synchronous and asynchronous open-loop power control.

The following is an equation expressing open-loop power control in synchronous CDMA.

$$\text{cdma mobile\_tx\_power} = -RSSI + \text{PowerOffset} + \text{NomPwr} + \text{IniPwr} + \text{Init\_coorection}$$

RSSI: Strength of signals that the MS receives from all BSs
PowerOffset: Value compensating for UL/DL path loss according to frequency and spreading rate
NomPwr, IniPwer: Compensation value that determines the weight of random access initial power
Init_correction: Correct the output of the MS according to Echo value measured at the MS.

Here, PowerOffset is a constant defined according to the frequency and radio configuration and Init_correction is a parameter compensating for the output (or power) according to the Ec/Io value measured at the MS. NomPwer and IniPwr are parameters indicating arbitrary compensation values set by the operator.

As can be seen from the above equation, open-loop power control in synchronous CDMA is determined solely by the strength of reception power according to the distance from the BS. However, actual reception power at the MS may vary due to a variety of factors such as a change in the output of the BS which rises up to 64 dB depending on the amount of communication or an increased deviation of the reception power at a region in which signals of multiple BSs overlap. From the reception power change, the MS may erroneously determine that the distance from the BS is decreased and then may perform open-loop power control. In addition, in the case where the level of noise in a signal received from the BS is increased due to an increased amount of communication or arbitrary noise, the MS should increase the power of transmission accordingly. However, the MS may fail to detect such a status change, thereby failing to correctly increase the transmission power. This may cause an increase in the number of access channel probe transmissions. That is, the method in which the MS derives the distance from the BS based only on the strength of reception power may exhibit numerous errors.

To prevent these errors, the asynchronous scheme utilizes the following two factors in order to perform a more accurate open-loop power control operation.

First, taking into consideration the fact that the output of the BS may change depending on the amount of communication, the BS broadcasts the output level of a common pilot channel (CPICH), which maintains a constant output regardless of the amount of communication, to all MSs and the MS measures the Received Signal Code Power (RSCP) of only the CPICH rather than the total reception power, thereby allowing the MS to calculate an accurate loss of the path from the BS to the MS. The CPICH output level is repeatedly broadcast through an SIB 5 message of a BCH (physically, a P-CCPCH).

Second, the BS broadcasts the BS reception noise level through a BCH (P-CCPCH) SIB 7 message at regular intervals to notify the MS of by how much the MS should increase the output level of open-loop power control for transmission to overcome the BS reception noise.

Based on these principles, the level of WCDMA open-loop power control is determined as follows.

RACH initial power=Path_loss+BS_reception noise+ RACH_Target_Echo=CPICH_Pwr−RSCP+UL interference+Constatn_Value CPICH_Pwr: The power of a DL CPICH of the BS over which the strongest level of PSC is received RSCP: Received Signal Code Power, i.e., the reception strength of a CPICH received from the MS UL interference: A noise level measured at the receiving end of the BS Target_Echo: A constant target Ec/Io value for random access reception DPCCH Initial power=DPCCH_Power_Offset−CPICH_RSCP DPCCH_Power_Offset=Req. Eb/No+Primary CPICH Tx Power+RTWP+10 log(R/W)+10 log((DPCCH/DPDCH)/(1+DPCCH/DPDCH))+Tx Antenna gain−Rx Diversity gain DPCCH_Power_Offst value is transmitted through an RRCConnectionSetup message DPDCH initial power=DPCCH power*(β_d/β_c)

Closed-loop power control is divided into inner-loop power control and outer-loop power control.

Inner-loop power control serves to adjust the output of the MS to a minimum level that can be appropriately received by the BS during uplink communication, thereby maximizing the capacity of uplink communication while minimizing the effects of interference on other BSs. More specifically, inner-loop power control serves to reduce the output level of each MS which is currently in a channel condition far higher than that corresponding to the reference Eb/No or SIR value and to increase the output level of each MS, which is currently in a channel condition worse than that corresponding to an Eb/No or SIR value less than the reference Eb/No or SIR value, within a maximum allowable output level of the MS. Power control also extends the battery life of the MS. Inner-loop power control is also referred to as "fast power control" since it is quickly performed between the Node-B (i.e., BS) and the MS. Inner-loop power control optimizes the output of a dedicated channel (DCH) that is being used for downlink communication, thereby maximizing the capacity of downlink communication while minimizing the effects of interference on MSs located in the areas of other BSs.

In UL inner-loop power control, if a Signal to Interference/Noise Ratio (SINR) of an uplink physical downlink control channel (PDCCH) pilot symbol measured at the BS is higher than a target SINR, the BS instructs the MS to reduce the output of the MS using a transmission power command (TPC) of a dedicated physical control channel (DPCCH). On the other hand, if the SINR measured at the BS is lower than the target SINR, the BS instructs the MS to increase the output of the MS using a transmission power command (TPC). More specifically, the control of the output of the MS indicates control of the uplink DPCCH power and the power of a DPDCH is adjusted in conjunction with that of the DPCCH according to a specified ratio (see FIG. 4).

A level setting parameter value of $\beta_d/\beta_c$ of the dedicated physical data channel (DPDCH) and the DPCCH can specified by the BS or can be set through calculation by the MS.

The power of an uplink HS-DPCCH of high speed downlink packet access (HSDPA) is also adjusted in conjunction with that of the DPCCH according to a ratio of $\beta_{hc}$ specified with respect to the DPCCH.

Since one 10 msec DCH frame includes 15 slots and uplink power control is performed on a slot by slot basis, uplink inner-loop power control is performed at a frequency of 1500 times per second. On the other hand, synchronous closed-loop power control is performed 800 times per second.

Figure 3:
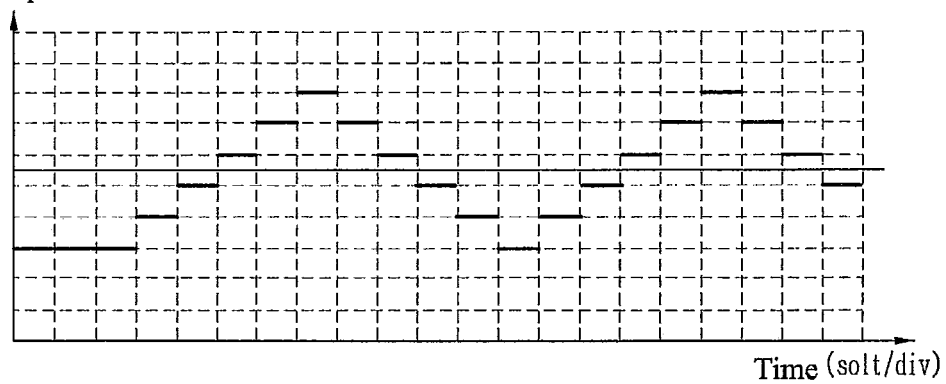
FIG. 3 illustrates changes of the output of an MS according to inner-loop power control in a stable radio condition.

FIG. 3 illustrates changes of the output of an MS according to inner-loop power control in a stable radio condition.

Uplink power control is not performed in perfect real time but instead is performed according to a closed-loop response with a slight time delay. Accordingly, no matter how stable the radio condition is, the output of the MS is not completely uniform and may exhibit changes in triangular forms having a constant period and a constant change width as shown in FIG. 3. This change width can be considered a type of jitter caused by closed-loop delay.

In downlink inner-loop power control, when an MS has received a downlink DCH signal, the MS measures an SINR of a DPCCH pilot symbol and issues a command requesting that a downlink DPDCH power allocated to the MS be increased if the measured SINR level is less than a threshold and issues a command requesting that the downlink DPDCH power be reduced if the measured SINR level is higher than the threshold.

Figure 4:
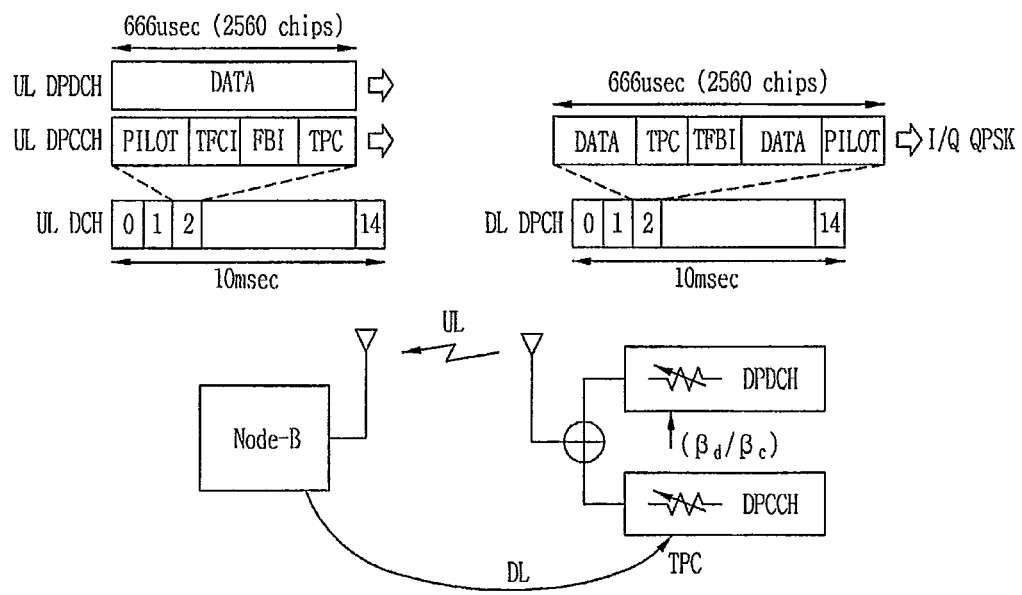
FIG. 4 illustrates frame structures of uplink/downlink DCHs and the operation of uplink inner-loop power control.

FIG. 4 illustrates frame structures of uplink/downlink DCHs and the operation of uplink inner-loop power control.

Figure 5:
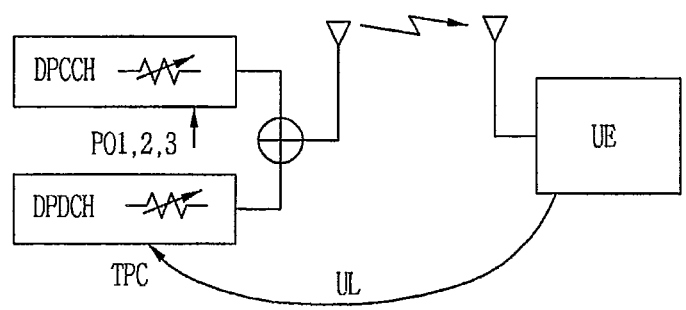
FIG. 5 illustrates the operation of downlink inner-loop power control.

FIG. 5 illustrates the operation of downlink inner-loop power control.

Figure 6:
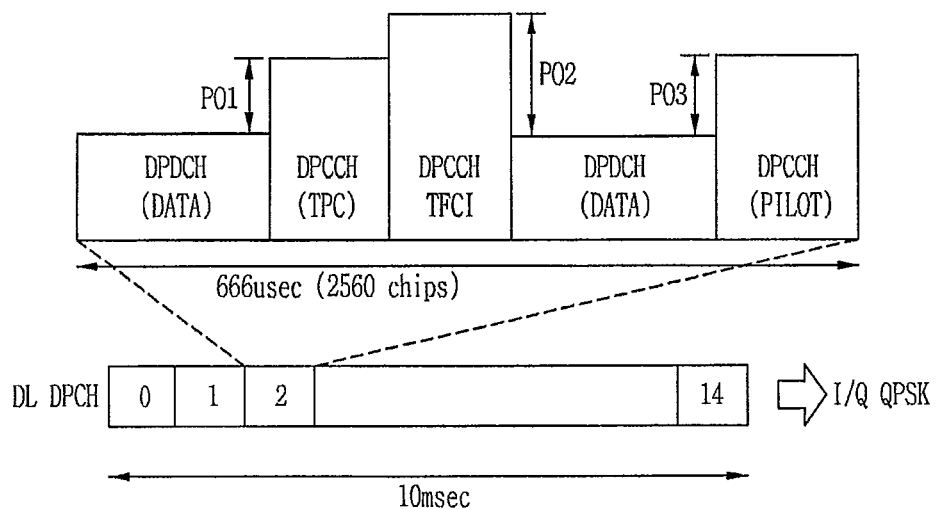
FIG. 6 illustrates the ratio of powers of a downlink DPDCH and a downlink DPCCH.

FIG. 6 illustrates the ratio of powers of a downlink DPDCH and a downlink DPCCH.

While uplink inner-loop power control serves to control the level of the uplink DPCCH, downlink inner-loop power control serves to control the level of the downlink DPCCH (see FIGS. 4 and 5). Transport format combination information (TFCI) of the downlink DPCCH, the TPC, and the power ratio of the DPDCH of the pilot symbol are defined as parameters P01, P02, and P03 as shown in FIG. 6 and are specified by the operator.

In the case of the HS-DSCH of the HSDPA, in a subframe duration during which a 16QAM modulation scheme in which transmission information is also included in the amplitude is used, power control should not be performed so as not to cause any change of the amplitude including transmission information.

The operator may set DL power control to be performed every slot (DPC_MODE=0) or every 3 slots (DPC_MODE=1). If the MS which is in a handover state is set such that DPC_MODE=1, the MS can transmit an uplink DPCCH TPC command using the same value every three slots.

The criterion for communication quality that the user actually experiences is the block error rate (BLER) or the frame error rate (FER) rather than the SINR. If inner-loop power control is performed using only the SINR as described above, the MS may exhibit characteristics of a BLER far below the target BLER, so that the quality of communication with other users and the capacity of communication are reduced due to excessive output of the MS. Or, in the opposite case, a problem may be caused in maintaining the quality of communication of the MS of its own. A process in which the reference SINR value of inner-loop power control is not fixed to a specific value but instead is changed on a 10 msec basis according to radio wave environments to maintain the measured BLER value at the target BLER value is referred to as "outer-loop power control".

Outer-loop power control is applied to both downlink and uplink and is generally performed at a low frequency of several times per second.

Figure 7:
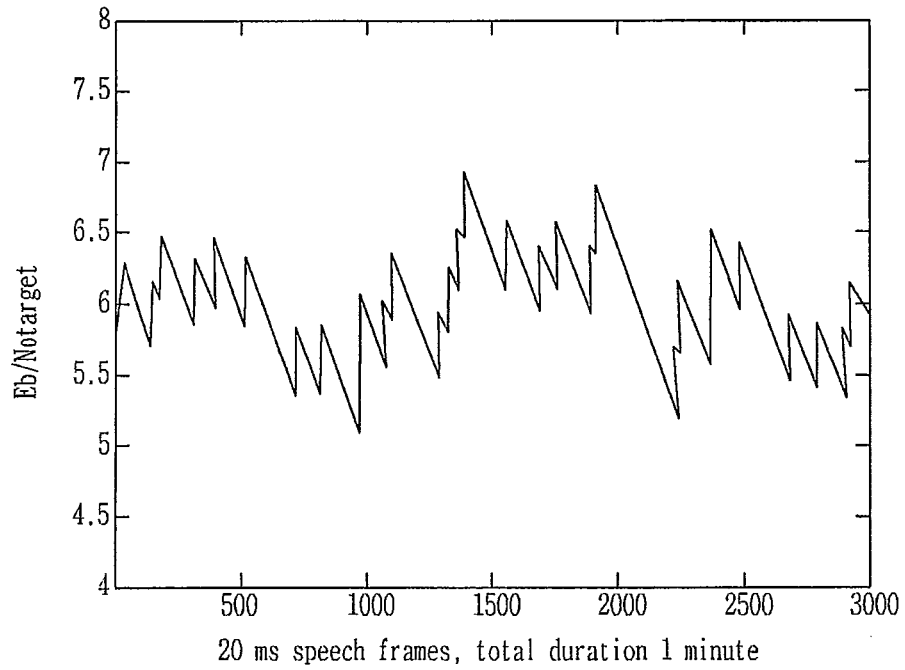
FIG. 7 illustrates an example of changes of the Eb/No value according to outer-loop power control.

FIG. 7 illustrates an example of changes of the Eb/No value according to outer-loop power control.

Table 1 illustrates SINR values required to maintain the quality of an adaptive multi-rate (AMR) voice service at a level corresponding to a BLER of 1% according to the radio condition of the communication user and FIG. 7 illustrates an example wherein a target $E_b/N_o$ value is changed using an outer-loop power control function in order to maintain the BLER of the AMR voice service at 1% in the ITU-R pedestrian A channel model. As shown in Table 1, the $E_b/N_o$ value required to maintain the same communication quality varies depending on the radio environments of the MS. Thus, it can be seen that the $E_b/N_o$ value cannot be the ultimate target of power control.

TABLE 1

| Multipath | UE speed(km/h) | Average $E_b/N_o$ target(dB) |
|---|---|---|
| Non-fading | — | 5.3 |
| ITU Pedestrain | 3 | 5.9 |
| ITU Pedestrain | 20 | 6.8 |
| ITU Pedestrain | 50 | 6.8 |
| ITU Pedestrain | 120 | 7.1 |
| 3-path equal powers | 3 | 6.0 |
| 3-path equal powers | 20 | 6.4 |
| 3-path equal powers | 50 | 6.4 |
| 3-path equal powers | 120 | 6.9 |

Figure 8:
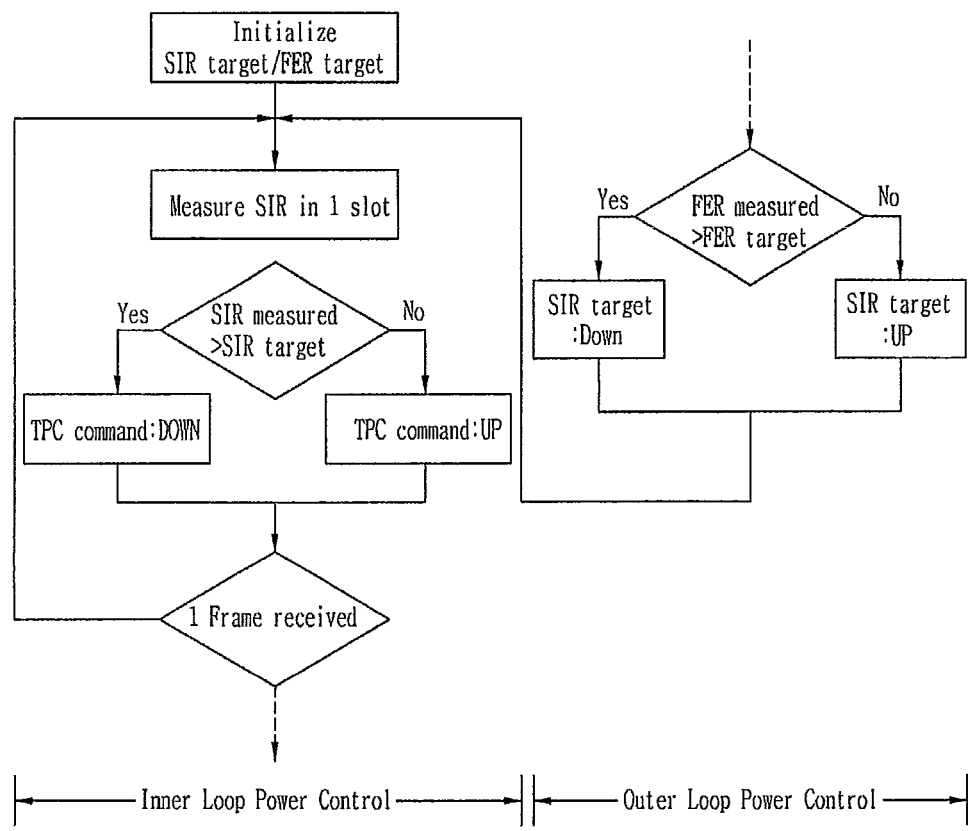
FIG. 8 illustrates the correlation between inner-loop and outer-loop power control functions.

FIG. 8 illustrates the operating principle of UL outer-loop power control.

Figure 9:
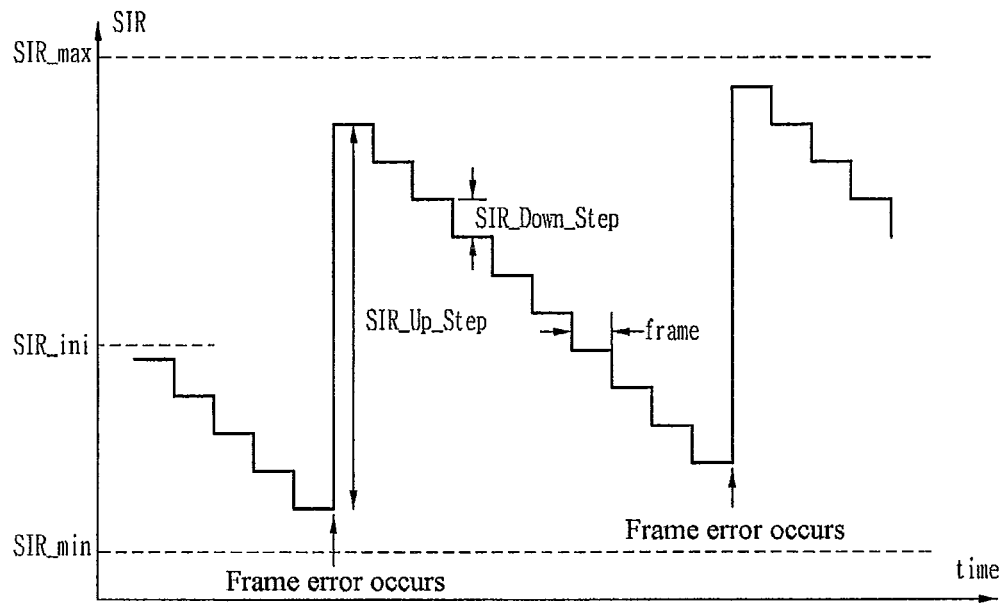
FIG. 9 illustrates control of a target SIR according to outer-loop power control.

FIG. 9 illustrates control of a target SIR according to outer-loop power control.

By combining the SIR_Down_Step value and the SIR_Up_Step value, it is possible to estimate a target BLER value as shown in FIG. 9. Here, a block error corresponding to a loop delay value of outer-loop power control may continually occur.

For example, when it is assumed that loop delay=0 (i.e., that real-time control is performed upon the occurrence of an event) and SIR_Up_Step=5 dB, and Target_BLER=1%, 99 good frames and 1 bad frame are present. Accordingly, the SIR value is stepped down by 5 dB during a duration of 99 frames and therefore the Down_Step value is 5 dB/99.

The operating principles and procedures of synchronous and asynchronous outer-loop power control are identical.

Tables 2 and 3 describe the types and functions of parameters defined for uplink/downlink inner-loop power control and outer-loop power control. Since the final purpose of all power control is to maintain the same BLER value, the initial operation of the power control is to set a target BLER value through power control. Generally, the target BLER value is set to 1% or 2%.

TABLE 2

| Parameters | Description |
|---|---|
| BLER_QUALITY_VALUE | Target DL BLER value |
| DPC_MODE | DL power control mode<br>1: Operate every TPC<br>0: Operate every 3 TPCs |
| PO1 | Level of TFCI bit with respect to DPDCH |
| PO2 | Level of TFCI bit with respect to DODCH |
| PO3 | Level of PILOT bit with respect to DPDCH |
| TPC_DLSTEP_SZ | Power control step |
| INIT_TX_PWR | Initial output level of DL DCH |

TABLE 2-continued

| Parameters | Description |
|---|---|
| MAX_PWR | Initial output level of DL DCH |
| MIN_PWR | Initial output level of DL DCH |

TABLE 3

| Parameters | Description |
|---|---|
| PWRCTRL_ALG | Select UL power control algorithm<br>1: Power control every slot at 1500 Hz<br>2: Power control every 5 slots at 300 Hz |
| BLER_QUALITY_VALUE | Target UL BLER value |
| UL_SIR | Initial OLPC SIR value |
| MAX_SIR | Minimum OLPC SIR value |
| MIN_SIR | Maximum OLPC SIR value |
| MAX_ULTX_PWR | Maximum MS power |
| TPC_STET_SZ | UL power control step |

The HS-PDSCH, which is a physical channel of the HSDPA, is a channel to which AMC is applied. Accordingly, an effective channel coding gain or a modulation scheme used in the HS-PDSCH are controlled according to the radio condition of the receiving MS to achieve the highest data rate that the current radio condition permits. That is, since the bit energy reaching the receiver is kept constant through the AMC function although the level of the HS-PDSCH is kept constant (i.e., although power control is not applied), the AMC function cannot replace the DL power control function.

The HSDPA AMC has a dynamic range of 30 dB. Accordingly, AMC is preferentially applied in a link adaptive manner for a channel radio condition change of 30 dB and power control is secondarily applied when the range is exceeded. That is, even when channel coding and the highest modulation level defined in AMC are used, if the reported channel condition is too high, the output level is reduced through power control since such too high channel condition indicates that excessive power is being used.

Figure 10:
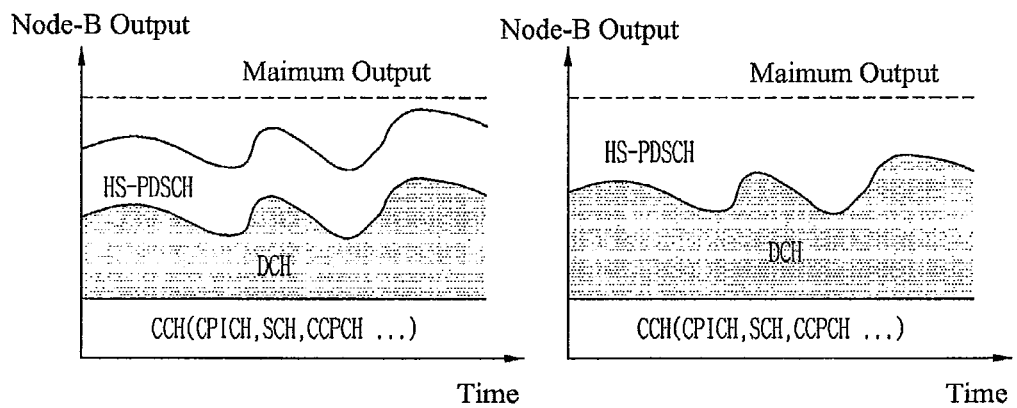
FIG. 10 illustrates two methods for allocating power to an HSDPA physical channel HS-DPSCH.

FIG. 10 illustrates two methods for allocating power to an HSDPA physical channel HS-DPSCH.

Although power allocation for the HS-PDSCH is not clearly defined in the standard specification, two allocation methods can be used in actual implementations. As illustrated in FIG. 10, in the first method, constant RF power may be allocated to the HS-PDSCH, and, in the second method, all the remaining BS HPA power that is left after the existing WCHMA Release 99 service is provided may be allocated to the HS-PDSCH.

Setting of power control for the uplink HS-DPCCH, which is a physical channel carrying control information of the HS-PDSCH, is statically performed according to a ratio specified for the uplink DPCCH.

The RF power level of various uplink/downlink physical channels varies according to the transfer rate and the static level set by the system operator or according to a dynamic power control function.

Figure 11:
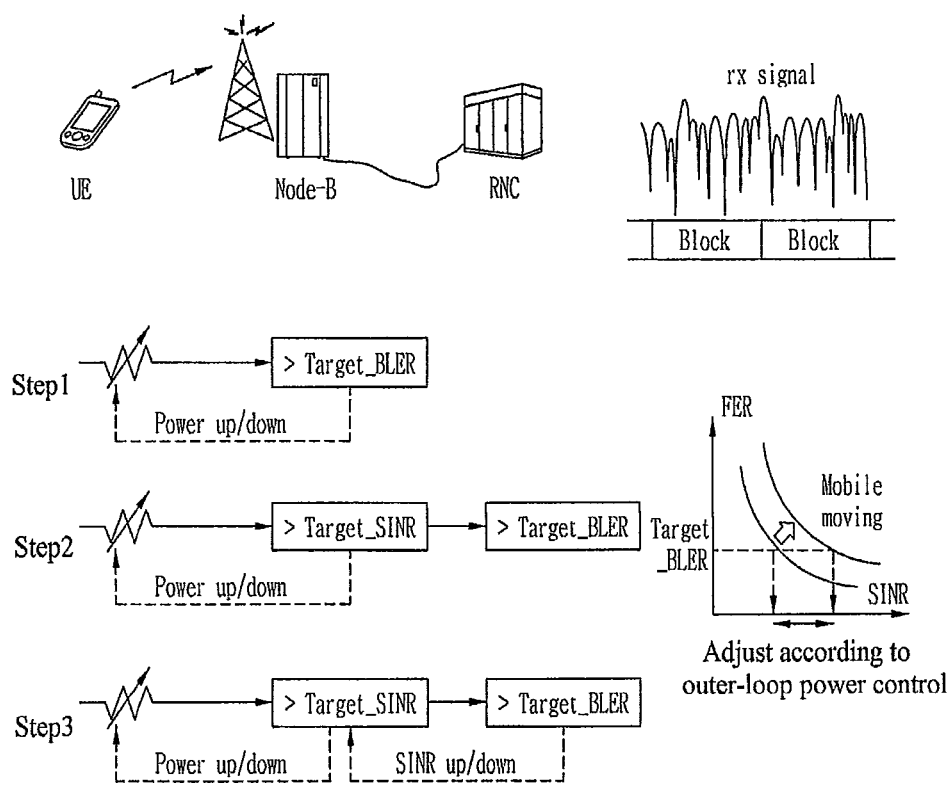
FIG. 11 illustrates the correlation between power control functions.

FIG. 11 illustrates the principle of implementing power control. The implementation principle of power control can be understood from the following processes.

Step 1) The purpose of power control is to achieve the same BLER (or FER). Accordingly, power control should be performed based on a target BLER.

Step 2) However, since the strength of a radio wave received during one block (frame) time of 10 msec (20 msec in the case of the synchronous scheme) very significantly and very rapidly varies due to multiple reflected waves, control of the output of the MS on a block (frame) basis may be meaningless. To overcome this problem, there is a need to perform rapid power control which is sensitive to channel changes even in one block (frame) and the Node-B sets an SINR (or Eb/No) threshold, which is one of the values in which the target reception BLER is reflected, as a new target value for power control and performs inner-loop power control according to the new target value.

Step 3) However, the BLER and the SINR threshold do not always match. That is, the correlation between the BLER and the SINR varies depending on movement of the user who is in communication. Accordingly, the SINR threshold, which is the target value of power control in the Node-B, can always be adjusted in conjunction with the target BLER which is the ultimate target value of power control.

Specifically, power control of 3GPP WCDMA is implemented in the following manner. The RNC measures the reception quality for a predetermined time and increases the target SINR value at the Node-B if the measured reception quality is lower than the target value (i.e., the target BLER) and decreases the target SINR value if the measured reception quality is excessively higher than the target value. To satisfy the target SINR value determined in this manner, the Node-B performs inner-loop power control at a high speed.

Figure 12:
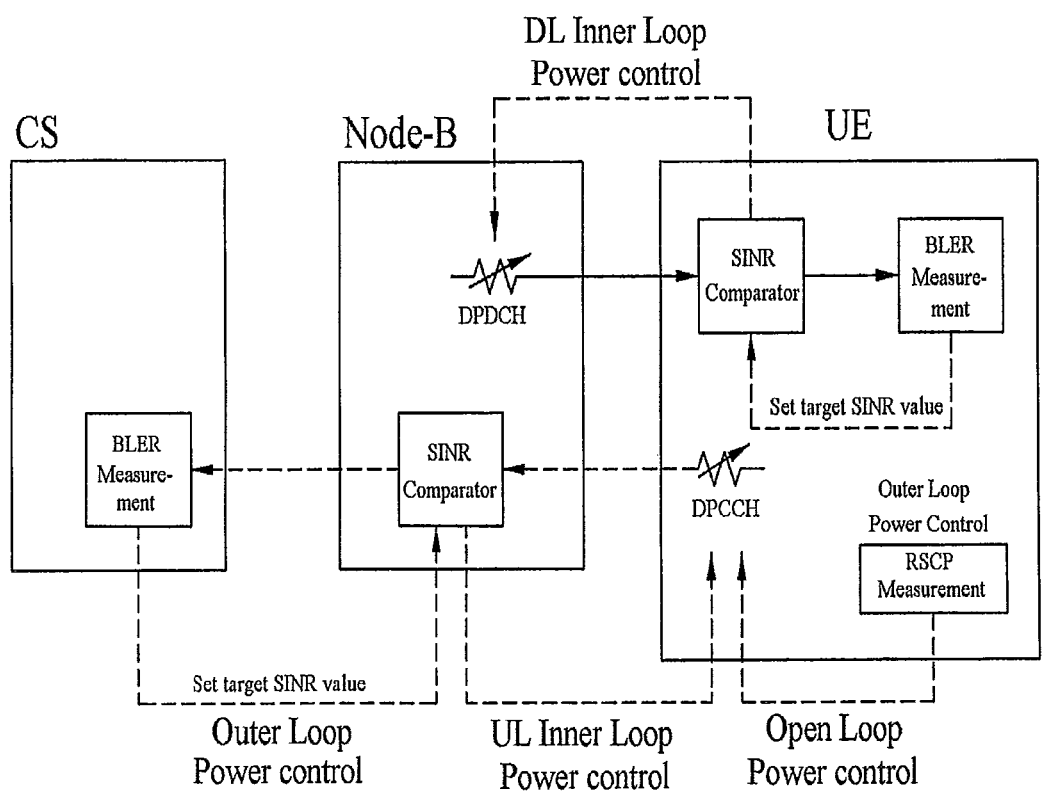
FIG. 12 illustrates the configurations of power control functions.

FIG. 12 illustrates the correlation between different types of power control and the locations thereof. The correlations and locations of power control functions of the synchronous and asynchronous schemes are basically identical. However, the functions of downlink power control in synchronous CDMA IS-95A/B in which wireless data transmission has not been recognized as being important have slightly different locations and structures.

For better understanding of power control according to the present invention, the above description is provided with reference to examples of synchronous/asynchronous systems that have been actually implemented in this technical field. However, it will be appreciated that application of the principles of the present invention that are described in the attached claims and are supported by the embodiments described below is not limited to such systems.

Although the above description has been exemplified by the CDMA system for explaining details of the concept of power control, the power control concept can also be applied to the OFDM/OFDMA systems.

OFDM is a multi-carrier modulation scheme in which a frequency band is divided into multiple orthogonal subcarriers to transmit data in order to reduce inter-symbol interference effects. In the OFDM scheme, serially received data symbols are converted into N parallel data symbols and the N parallel data symbols are carried over N separate subcarriers, respectively. The subcarriers allow orthogonality to be maintained in the frequency dimension. Each orthogonal channel undergoes independent frequency selective fading, and the interval between the transmitted symbols is increased, thereby minimizing inter-symbol interference. Orthogonal Frequency Division Multiple Access (OFDMA) is a multiple access method in which some of the subcarriers available in the system which uses OFDM as a modulation scheme are individually provided to each user, thereby achieving multiple access. In the OFDMA scheme, a subcarrier is provided as a frequency resource to each user. Generally, in the OFDMA scheme, the frequency resources are individually provided to multiple users so that the frequency resources of the users do not overlap. As a result, frequency resources are exclusively allocated to each user. Accordingly, in OFDMA, a total frequency range can be divided into a number of sub-bands to be processed, unlike CDMA.

The OFDMA system also uses a power control scheme as one method to reduce inter-cell interference caused by adjacent cells and path loss caused by the distance between the BS and the MS. By using the power control scheme, it is possible to adjust transmission power so that data can be transmitted with the lowest power level while maintaining a certain quality of service (QoS) of the wireless communication system.

The embodiments described below can be applied to the OFDMA system. However, the present invention can also be applied to a system that includes a plurality of MSs that commonly use the same frequency band at the same time in multi-cell environments.

<Embodiment 1>Open-Loop Power Control

Reference will now be made to how uplink open-loop power control is performed according to an embodiment of the present invention in the case where one MS uses one time-frequency-domain resource and in the case where two or more MSs simultaneously use one time-frequency-domain resource.

The method for controlling power when two or more MSs use the same resource according to this embodiment uses a power control scheme represented by a function of the number of simultaneous users M. Basically, this method does not reduce performance while maintaining a level of interference that can be obtained through the power control method in the case where one MS uses one time-frequency-domain resource.

For example, let us consider a first scheme in which a signal transmitted from one antenna of one MS through one (time or frequency) resource region is received through a plurality of antennas of a BS and a second scheme in which two or more MSs simultaneously transmit a signal. In this specification, the first scheme may also be referred to as an "SI_MO scheme". Here, the second scheme may be a Collaborative Spatial Multiplexing (CSM) or Virtual Spatial Multiplexing (VSM) scheme. The number of MSs that transmit signals using the same resource in each BS or cell/sector in the second scheme is greater than that of the first scheme. Here, if transmission power per MS in the second scheme is set to be equal to transmission power per MS of the first scheme, the amount of interference with other cells or sectors will increase. Accordingly, to prevent such an increase in the amount of interference with other cells or sectors, it is necessary to control transmission power using a scheme in which the number of MSs that simultaneously transmit signals is taken into consideration. Transmission power control according to this scheme can be represented by the following Mathematical Expression 1.

$$Tx\_power\_level(dBm) = Tx\_Power_{SI\_MO} + f(M)[dBm \text{ per subcarrier}] \quad \text{[MATHEMATICAL EXPRESSION 1]}$$

In Mathematical Expression 1, "dBm per subcarrier" can be replaced with "dBm per Hz". Here, "$Tx\_Power_{SI\_MO}$" represents transmission power per MS set according to the first scheme. "$f(M)$" represents an adjustment value of transmission power according to the number of MSs (M) that simultaneously transmit signals using the same resource. Mathematical Expression 1 can also be associated with a Modulation and Coding Scheme (MCS) level used for transmission.

If Mathematical Expression 1 is not associated with the MCS level, $f(M)$ can be represented by Mathematical Expression 2 or Mathematical Expression 3.

$$f(M) = -(M)dB \quad \text{[MATHEMATICAL EXPRESSION 2]}$$

$$f(M) = -(M-1)dB \quad \text{[MATHEMATICAL EXPRESSION 3]}$$

According to the method of this embodiment, the amount of interference caused to a neighboring cell or sector when two or more MSs simultaneously transmit signals using the same resource can be equal to the amount of interference caused to a neighboring cell or sector when one MS transmits signals.

If Mathematical Expression 1 is associated with the MCS level, Mathematical Expression 1 can be modified to the following Mathematical Expression 4.

$$Tx\_power\_level(dBm)=Tx\_Power\_{SI\_MO}+f(M,MCS) \quad \text{[MATHEMATICAL EXPRESSION 4]}$$

where f(M, MCS) represents an adjustment value of transmission power according to the MCS level and the number of MSs (M) that simultaneously transmit signals using the same resource.

Mathematical Expression 2 or Mathematical Expression 4 can be generalized as the following Mathematical Expression 5.

$$Tx\_power\_level(dBm)=f(Tx\_Power\_{SI\_MO},M,MCS) \quad \text{[MATHEMATICAL EXPRESSION 5]}$$

Figure 13A:
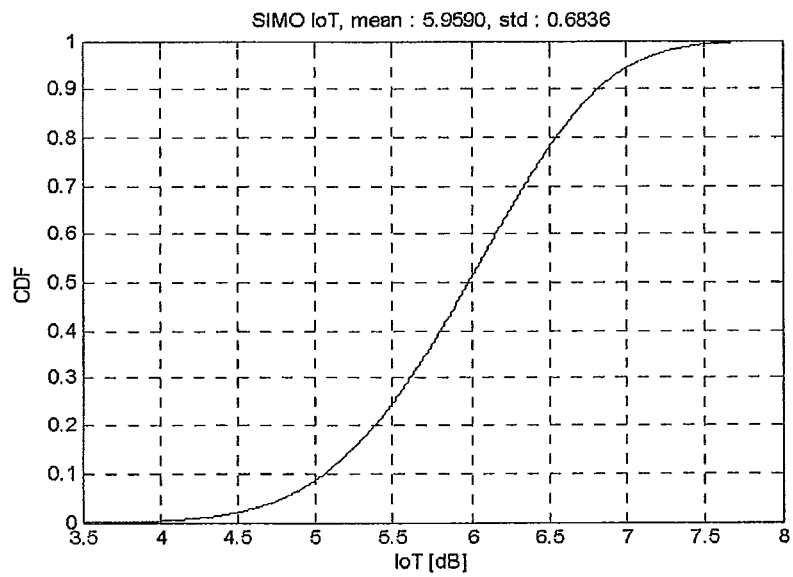
FIGS. 13A and 13B illustrate an IoT level that can be obtained when simulation is performed according to an embodiment of the present invention.
Figure 13B:
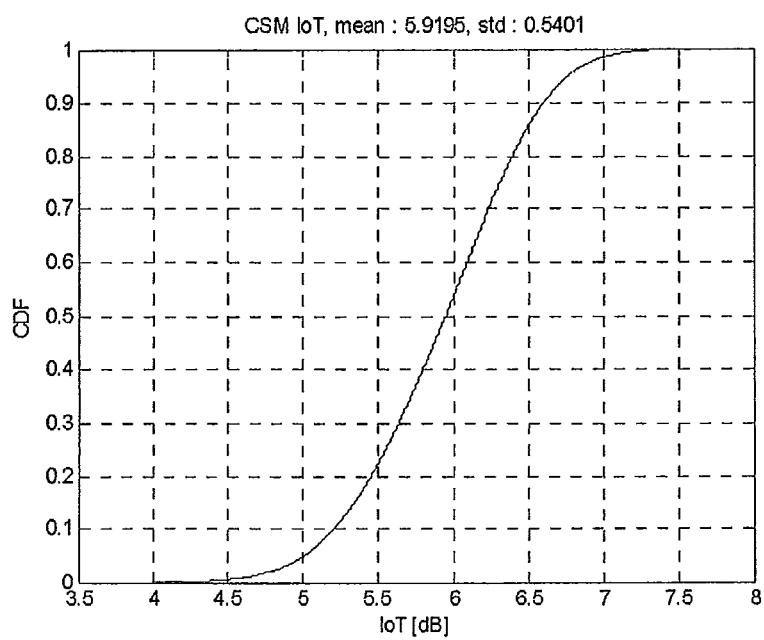

FIGS. 13A and 13B illustrate an IoT level that can be obtained when simulation is performed according to this embodiment.

Specifically, FIGS. 13A and 13B illustrate a Cumulative Distribution Function (CDF) of the IoT level in each time zone of each sector when an MS transmits signals according to the scheme 1 and the scheme 2 described above in the OFDMA system. Here, the IoT, which stands for Interference over Thermal noise, satisfies the condition of "IoT=(I+N)/N", where "I" represents the total amount of interference that MSs cause to other BSs and "N" represents thermal noise power. FIG. 13A illustrates simulation results according to the scheme 1 and FIG. 13B illustrates simulation results according to the scheme 2.

If power control is performed using Mathematical Expression 1 as described above, an average IoT level and a distribution of IoT when one MS has transmitted signals in each resource region can become similar to an average IoT level and a distribution of IoT when two or more MSs have transmitted signals. Thus, it is possible to improve system performance.

Although "IoT=(I+N)/N" is used as a reference for performance estimation according to this embodiment in FIGS. 13A and 13B, NI (=Interference+noise) or simply an interference level may be used as a reference for performance estimation.

<Embodiment 2>Closed-Loop Power Control 1

Closed-loop power control according to another embodiment of the present invention can be represented by Mathematical Expression 6 or Mathematical Expression 7.

$$P_{new}=P_{last}+\Delta_{TPC} \quad \text{[MATHEMATICAL EXPRESSION 6]}$$

$$P_{new}=A+\Delta_{TPC} \quad \text{[MATHEMATICAL EXPRESSION 7]}$$

In Mathematical Expression 6, $P_{new}$ represents transmission power in a new frame, $P_{last}$ represents transmission power in a previous frame, and $\Delta_{TPC}$ represents the difference between the two transmission powers. In Mathematical Expression 7, "A" represents a reference transmission power, which may be equal to that of the equation of closed-loop power control for one MS. The BS can transmit "$\Delta_{TPC}$" to the MS at regular or irregular intervals. When the value "$\Delta_{TPC}$" is transmitted at regular intervals, the period at intervals of which the value is changed may be, without being limited to, a subframe(s), a frame(s), or a radio frame(s).

Figure 14:
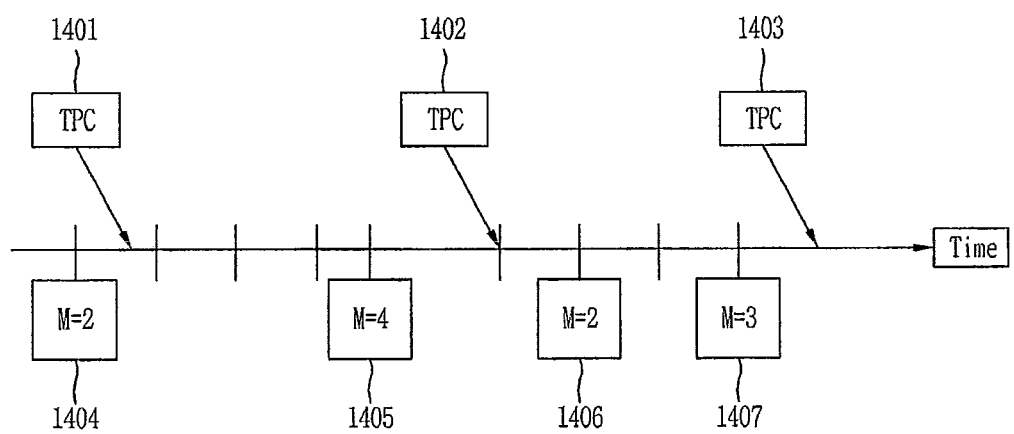
FIG. 14 illustrates a relationship between reception of a transmission power control signal and uplink transmission according to an embodiment of the present invention.

FIG. 14 illustrates a relationship between reception of a transmission power control signal and uplink transmission.

When closed-loop power control is performed according to this embodiment, the BS can transmit a Transmission Power Command (TPC) message to MSs at intervals of a predetermined period or irregular intervals. In this case, the number of MSs (M) which simultaneously use resources of one time-frequency region can be changed more frequently than the period at intervals of which the TPC message is received as shown in FIG. 14. For example, the number of MSs is changed four times while the TPC message is transmitted three times in the example of FIG. 14. In this case, each MS can take into consideration the M value when determining transmission power to transmit data in uplink. The BS may determine and transmit the M value to the MS.

For example, the TPC message may indicate the amount of power change for one MS that uses resources of a specific time-frequency region in dB. Alternatively, the TPC message may indicate the amount of power change for each of two or more MSs that use resources of a specific time-frequency region in dB. Accordingly, for example, TPCs 1401, 1402, and 1403 shown in FIG. 14 each indicate the amount of power change for one MS in dB. Each of the TPCs 1401, 1402, and 1403 is determined based on the number of MSs (M) that is determined immediately before the TPC is transmitted. For example, the TPCs 1401, 1402, and 1403 are determined based on M=2 (1404), M=4 (1405), and M=3 (1407).

The transmission power level can be adjusted according to the multiplexing ratio M of MSs that use time-frequency-domain resources. The multiplexing ratio M can be determined by receiving a predetermined indicator/message from the BS.

Figure 15A:
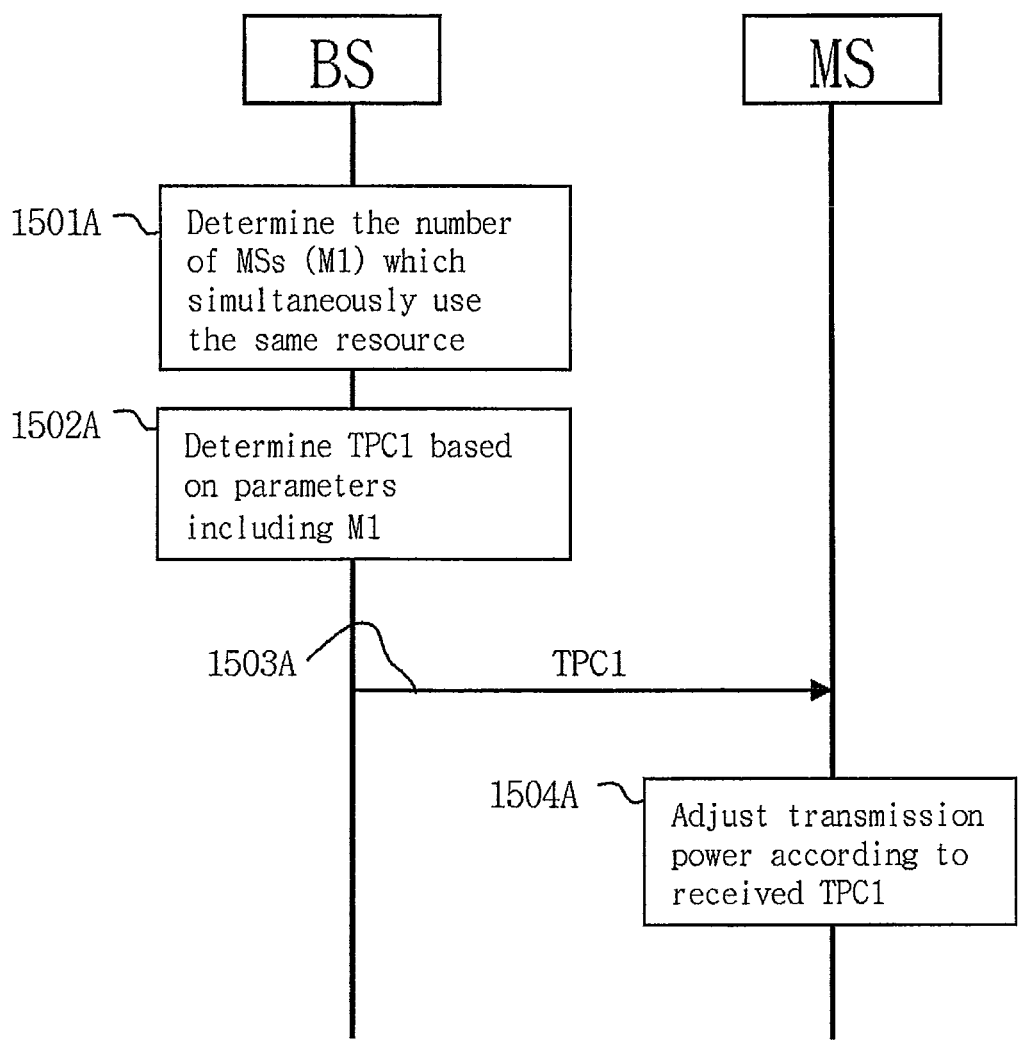
FIGS. 15A and 15B illustrate a power control method according to an embodiment of the present invention.
Figure 15B:
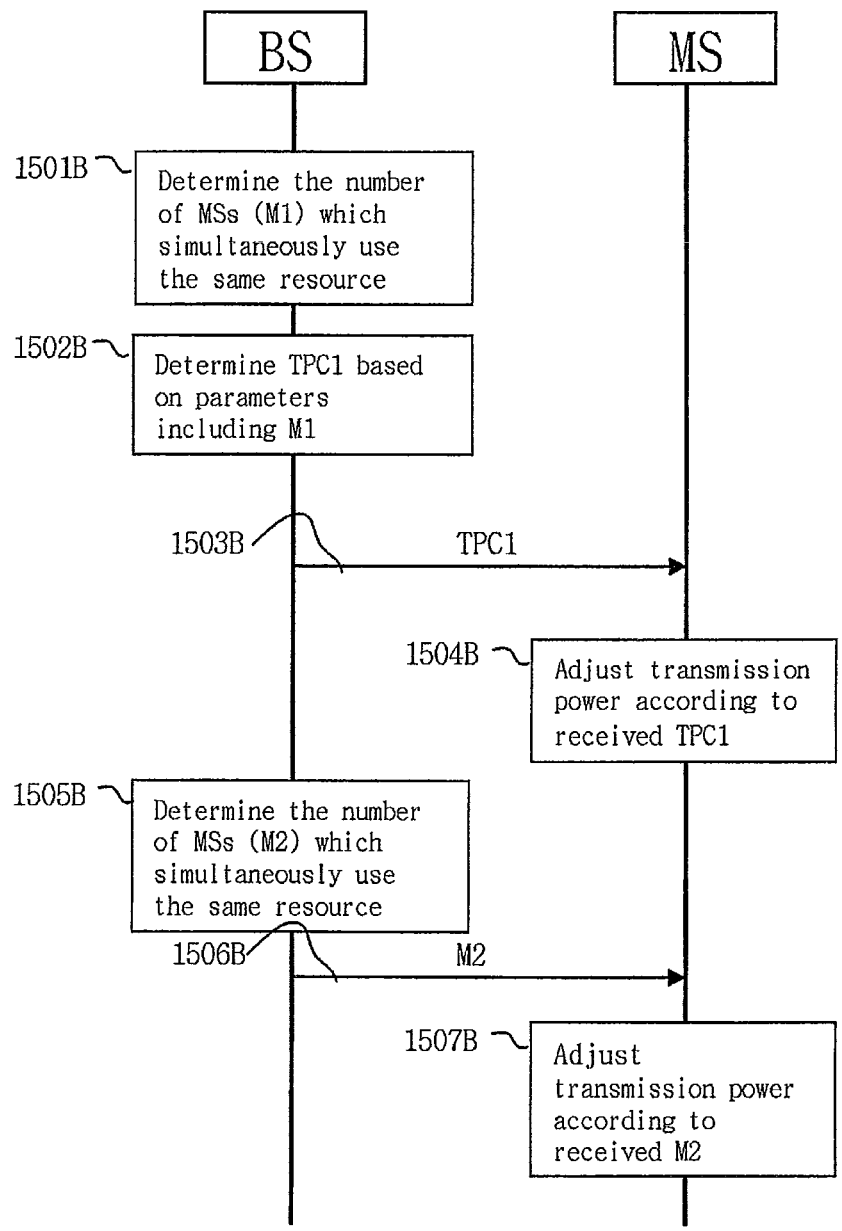

FIGS. 15A and 15B illustrate a power control method according to an embodiment of the present invention.

FIG. 15A illustrates the power control method of FIG. 14 in a different fashion. At step 1501A, a BS determines the number of MSs (M1) which simultaneously use the same resource. At step 1502A, the BS determines TPC1 based on parameters including the determined number of MSs (M1). Here, the parameters may include noise and interference levels at the BS. At step 1503A, the BS transmits the determined TPC1 to each MS. At step 1504A, the MS adjusts transmission power according to the received TPC1.

FIG. 15B illustrates a modification of the method of FIG. 15A wherein each MS can calculate an amount of power adjustment and adjust transmission power according to the calculated amount. Steps 1501B-1504B are identical to the above steps 1501A-1504A of FIG. 15A. At step 1505B, the BS recalculates the number of MSs (M2) which simultaneously use the same resource. At step 1506B, the BS transmits the value M2 to each MS. At step 1507B, the MS can adjust transmission power according to the received value M2. Here, the MS can adjust transmission power according to at least one of Mathematical Expressions 1 to 7.

Although not illustrated, the BS can transmit not only TPC1 information but also M1 information at step 1503B. Then, at step 1507B, the MS can adjust transmission power using the difference between M2 and M1.

Although a control signal is illustrated as being transmitted to only one MS in FIGS. 15A and 15B, the same signal can be transmitted as a dedicated signal or a broadcast signal to other MSs.

In this embodiment, in the case where a different multiplexing ratio $M_k$ is used for each time-frequency resource region, the above message can be constructed as a type of dedicated message. For example, let us assume that the total frequency band is divided into N subbands. Here, if the number of MSs multiplexed using subband #0 is $M_1$ and the number of MSs multiplexed using subband #N−1 is $M_2$, a dedicated message #0 can be transmitted to $M_1$ MSs while a dedicated message #N−1 can be transmitted to $M_2$ MSs.

On the other hand, in the case where a single multiplexing ratio M is used for all frequencies at a specific time or in a specific time zone, the above message can be constructed as a type of broadcast message. For example, let us assume that the total frequency band is divided into N subbands. Here, if the number of MSs multiplexed in each subband is M, it is only necessary to transmit the same message to all MSs. Accordingly, the message can be transmitted as a type of broadcast message. This can reduce the amount of control overhead.

When the MS receives such a dedicated message or broadcast message, the MS can reflect the resulting value, which has been obtained taking the multiplexing ratio into consideration, in the power control equation for single user as in Mathematical Expressions 1 to 7 described above.

Tables 4 and 5 illustrate an example of the dedicated message described above.

TABLE 4

| Field | Number of bits | |
|---|---|---|
| UserID | xxx bits | |
| Multiplexing rate(M) or rate difference | xx bits | |
| Start point(time domain) | xxx bits | Optional |
| End point(time domain) | xxx bits | Optional |

TABLE 5

| Field | Number of bits | |
|---|---|---|
| UserID | xxx bits | |
| Multiplexing rate(M) or rate difference | xx bits | |
| PowerAdjust value Method other than F(M) = −(M)dB | xxx bits | It is possible to determine and transmit an appropriate value using the multiplexing value (dB or linear or predetermined index) |
| Start point(time domain) | xxx bits | Optional: Frame Index |
| End point(time domain) | xxx bits | Optional: Frame Index |

Table 4 illustrates the case where f(M) in Mathematical Expression 1 is represented by f(M)=−(M)dB and Table 5 illustrates the case where f(M) in Mathematical Expression 2 is represented by a different equation from f(M)=−(M)dB. In Tables 4 and 5, the first column represents fields included in the dedicated message. The second column represents the number of bits of each field. In the message type according to Table 4, it is always assumed that f(M)=−(M)dB. In the message type according to Table 5, the equation f(M)=−(M)dB is not applied and the power adjustment value f(M) is represented by one of a variety of functions of M. Since Tables 4 and 5 represent the dedicated message type, each of the tables needs a UserID field indicating a user ID. In addition, the multiplexing ratio M may be transmitted or alternatively the difference between the multiplexing ratio of the previous frame and the multiplexing ratio of the current frame may be transmitted. In Table 4, it is always assumed that f(M)=−(M) dB. However, when the power adjustment value is represented by one of a plurality of functions of M, the table may include a field indicating which function is used as in Table 5. The table may also include a field indicating start and end times of a time zone for representing a time section to which the transmitted M value is to be applied.

Tables 6 and 7 represent an example of the broadcast message described above.

TABLE 6

| Field | Number of bits |
|---|---|
| Multiplexing-rate(M) | xx bits |
| Start point(time domain) | xxx bits |
| End point(time domain) | xxx bits |

TABLE 7

| Field | Number of bits |
|---|---|
| Multiplexing-rate(M) | xx bits |
| Power Adjust value Method other than F(M) = −(M)dB | xxx bits |
| Start point(time domain) | xxx bits |
| End point(time domain) | xxx bits |

Since Tables 6 and 7 represent an example broadcast message, the tables need not include a field indicating a user ID. In Table 6, it is always assumed that f(M)=−(M)dB. However, when the power adjustment value is represented by one of a plurality of functions of M, the table may include a field indicating which function is used as in Table 7.

Although the number of bits representing each field is illustrated as being 2 or 3 in Tables 4 to 7, the number of bits is not limited to 2 or 3.

<Embodiment 3>

Power control according to another embodiment of the present invention can be represented by Mathematical Expressions 8 to 11.

$$CLPC_{new}(\text{dBm}) = CLPC_{last}(\text{dBm}) + g(M)(\text{dB}) \quad [\text{MATHEMATICAL EXPRESSION 8}]$$

$$CLPC_{new}(\text{dBm}) = CLPC_{last}(\text{dBm}) + g(\Delta M)(\text{dB}) \quad [\text{MATHEMATICAL EXPRESSION 9}]$$

$$CLPC_{new}(\text{dBm}) = CLPC_{reference}(\text{dBm}) + h(M)(\text{dB}) \quad [\text{MATHEMATICAL EXPRESSION 10}]$$

$$CLPC_{new}(\text{dBm}) = CLPC_{reference}(\text{dBm}) + h(\Delta M)(\text{dB}) \quad [\text{MATHEMATICAL EXPRESSION 11}]$$

In Mathematical Expression 8, $CLPC_{new}$ represents a transmission power of the current frame, $CLPC_{last}$ represents a transmission power of an immediately previous frame, and g(M) represents the difference between the two transmission powers. In the above embodiment associated with Mathematical Expression 6, the $\Delta_{TPC}$ value, which is the difference between the transmission powers of the two signals, is transmitted. However, in the embodiment associated with Mathematical Expression 8, if the multiplexing ratio M is transmitted, then g(M) which is the difference between the transmission powers of the two signals is calculated using the M value. On the other hand, $\Delta M$ rather than M may also be transmitted as in Mathematical Expression 9. Here, $\Delta M$ is the difference between the multiplexing ratio of the previous frame and the multiplexing ratio of the current frame.

In Mathematical Expression 10, $CLPC_{reference}$, which represents a reference transmission power, is equal to that of the equation for closed-loop power control for one MS and h(M) is a value calculated according to the multiplexing ratio M. In the above embodiment associated with Mathematical Expression 7, the $\Delta_{TPC}$ value, which is the difference between the transmission power of the current frame and the reference transmission power, is transmitted. However, in the embodiment associated with Mathematical Expression 10, if the multiplexing ratio M is transmitted, then g(M) which is a value corresponding to $\Delta_{TPC}$ is calculated using the M value. On the other hand, ΔM rather than M may also be transmitted as in Mathematical Expression 11. Here, ΔM is the difference between the multiplexing ratio of the previous frame and the multiplexing ratio of the current frame.

The BS can transmit the value "M" or "ΔM" to the MS at regular or irregular intervals. When the value "M" or "ΔM" is transmitted at regular intervals, the period at intervals of which the value is changed may be, without being limited to, a subframe(s), a frame(s), or a radio frame(s).

The method of FIG. 14 may also be applied to the embodiment of Mathematical Expressions 8 to 11. The only difference is that the M value is transmitted instead of transmitting the TCP message as in the method of FIG. 14.

The present invention can be applied to a wireless mobile communication system which uses multiple carriers. Particularly, the present invention can be applied to an orthogonal frequency division multiplexing access (OFDMA) system, an orthogonal frequency division multiplexing (OFDM) system, a single carrier-frequency division multiplexing (SC-FDMA) system, etc. The present invention can also be applied to a frequency division multiplexing (FDM) system which uses multiple carriers.

The above embodiments can be implemented by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be used in a broadband wireless mobile communication system in multi-cell environments.

The invention claimed is:

1. A method for controlling an uplink transmission power value by a mobile station in a wireless mobile communication system, the method comprising:
receiving, information including a number representing a total count of mobile stations allocated to a given time-frequency resource region, from a base station;
receiving, a noise and interference (NI) level estimated by the base station, from the base station;
determining the uplink transmission power value by using the NI level, a power adjustment value and a reference transmission power value,
wherein the power adjustment value is obtained based on the received number,
wherein the reference transmission power value is equal to a transmission power value of the mobile station when only the mobile station transmits an uplink signal through the given time-frequency resource region, and
wherein the determined uplink transmission power value is represented as a dBm value per subcarrier; and
transmitting the uplink signal through the given time-frequency resource region based on the determined uplink transmission power value.

2. The method according to claim 1, further comprising:
at the determining step, the power adjustment value is given by −M(dB), where M is the received number.

3. The method according to claim 1, further comprising:
at the determining step, the power adjustment value is calculated by a joint function including the received number and a modulation coding scheme (MCS) level.

4. The method according to claim 1, wherein the reference transmission power value is equal to a transmission power value of a signal transmitted in a previous frame.

5. A method for controlling an uplink transmission power value in a wireless communication, the method comprising:
transmitting, by a base station to a mobile station, information including a number representing a total count of mobile stations allocated to a given time-frequency resource,
transmitting, an estimated noise and interference (NI) level, to the mobile station; and
receiving an uplink signal through the given time-frequency resource region from the mobile station,
wherein the uplink signal is received at the uplink transmission power value determined by the mobile station,
wherein the determined uplink transmission power value is determined by using the NI level, a power adjustment value and a reference transmission power value,
wherein the power adjustment value is obtained based on the received number,
wherein the reference transmission power value is equal to a transmission power value of the mobile station when only the mobile station transmits the uplink signal through the given time-frequency resource region, and
wherein the determined uplink transmission power value is represented as a dBm value per subcarrier.

6. A mobile terminal configured to control an uplink transmission power value in a wireless communication system, the mobile terminal comprising:
a circuit configured to:
receive, from a base station, information including a number representing a total count of mobile stations allocated to a given time-frequency resource region,
receive, from the base station, a noise and interference (NI) level estimated by the base station;
determine the uplink transmission power value for the given time-frequency resource region,
wherein the determined uplink transmission power value is determined by using the received NI level, a power adjustment value and a reference transmission power value,
wherein the power adjustment value is obtained based on the received number,
wherein the reference transmission power value is equal to a transmission power value of the mobile station when only the mobile station transmits an uplink signal through the given time-frequency resource region, and
wherein the determined uplink transmission power value is represented as a dBm value per subcarrier, and
transmit the uplink signal through the given time-frequency resource region based on the determined uplink transmission power value.

7. A base station for controlling an uplink transmission power value in a wireless communication, the base station comprising:
a circuit configured to:
transmit, information including a number representing a total count of mobile stations allocated to a given time-frequency resource region, to a mobile station;
transmit, an estimated noise and interference (NI) level, to the mobile station; and
receive an uplink signal through the given time-frequency resource region from the mobile station,
wherein the uplink signal is received at the uplink transmission power value determined by the mobile station,
wherein the determined uplink transmission power value is determined by using the NI level, a power adjustment value and a reference transmission power value,
wherein the power adjustment value is obtained based on the received number,
wherein the reference transmission power value is equal to a transmission power value of the mobile station when only the mobile station transmits the uplink signal through the given time-frequency resource region, and
wherein the determined uplink transmission power value is represented as a dBm value per subcarrier.

* * * * *